73-151.5 CROSS REFERENCE SEARCH ROOM

Dec. 1, 1964 O. V. PHILLIPS 3,159,448

RECORDING APPARATUS FOR USE WITH WELL DRILLING EQUIPMENT

Filed March 7, 1956 4 Sheets-Sheet 1

INVENTOR.
OLIVER V. PHILLIPS
BY
Philip H. Sheridan

Dec. 1, 1964 O. V. PHILLIPS 3,159,448

RECORDING APPARATUS FOR USE WITH WELL DRILLING EQUIPMENT

Filed March 7, 1956 4 Sheets-Sheet 2

INVENTOR.
OLIVER V. PHILLIPS
BY
Philip H. Sheridan

RECORDING APPARATUS FOR USE WITH WELL DRILLING EQUIPMENT

Filed March 7, 1956 4 Sheets-Sheet 3

INVENTOR.
OLIVER V. PHILLIPS
BY
Philip H. Sheridan

RECORDING APPARATUS FOR USE WITH WELL DRILLING EQUIPMENT

Filed March 7, 1956

INVENTOR.
OLIVER V. PHILLIPS
BY Philip H. Sheridan

United States Patent Office 3,159,448

Patented Dec. 1, 1964

3,159,448

RECORDING APPARATUS FOR USE WITH WELL DRILLING EQUIPMENT

Oliver V. Phillips, Littleton, Colo., assignor to The Star Recorder Corporation of Denver, Denver, Colo., a corporation of Colorado Filed Mar. 7, 1956, Ser. No. 570,116

8 Claims. (Cl. 346—33)

This invention relates to an improved recording apparatus, particularly usable with earth bore drilling equipment whereby information as to the time required for drilling formations and for conducting operations other than drilling may be permanently recorded. Specifically, the apparatus incorporates a single stylus arranged to mark a chart rotated at a predetermined rate in such a manner that the chart will reflect rate of drilling penetration or the time required to perform operations other than drilling and in instances where the other operations require vertical movement of the drill stem, the direction of such movement will be marked on the chart.

It is, of course, very desirable to have or be able to obtain a permanent and complete record of the rate of penetration when drilling and also, information correlated with time as to the various operations taking place other than drilling. This is so for, among other reasons, it permits the operator to analyze the entire operations, to determine whether the earth strata being drilled is hard or soft, to study the efficiency of the crew and to ascertain the daily cost with respect to operations taking place. Among the operations that occur frequently other than drilling are changing of drill bits, adding sections of drill pipe, reaming and making various connections and repairs.

In the past, to the best of my knowledge, recording apparatus of this general type has incorporated at least two pens or stylus and associated structure for each, one of the pens being for recording drilling penetration with respect to time and the other pen being for recording information pertaining to operations taking place in the well other than drilling, some of which require vertical movement of the drill stem. It is an important object of this invention to provide an improved apparatus for recording this same information, but which incorporates only a single pen or stylus.

It is also an object of this invention to provide apparatus of the type described which is composed of a minimum of parts as compared with the double pen type of recorder, which thereby results in less servicing in the field.

Further, it is an object of this invention to provide a recorder of the type described wherein a single stylus is employed and has associated therewith means for positioning the stylus in either of two base line positions, the drilling penetration with respect to time being recorded in one position and information relative to the other operations correlated with time being recorded in the second position.

Yet another object of the invention is to provide an apparatus as described in the preceding paragraph incorporating means for shifting the stylus on and off the base lines in both positions to provide markings indicative of vertical movement of the drill stem, such also being correlated with time.

Finally, it is an object to provide apparatus as described in the last two paragraphs wherein the stylus is carried by a pivotally mounted stylus arm operatively associated with a pivotally mounted bracket assembly, and means for pivoting the arm independently of the assembly when the stylus is in the position for recording rate of drilling penetration and with the assembly as a unit when the stylus is in the other base position.

Other objects and advantages of the invention will become apparent upon considering the detailed description in conjunction with the drawings wherein like numerals represent similar parts throughout and wherein a preferred embodiment is illustrated:

Figures 1, 2:
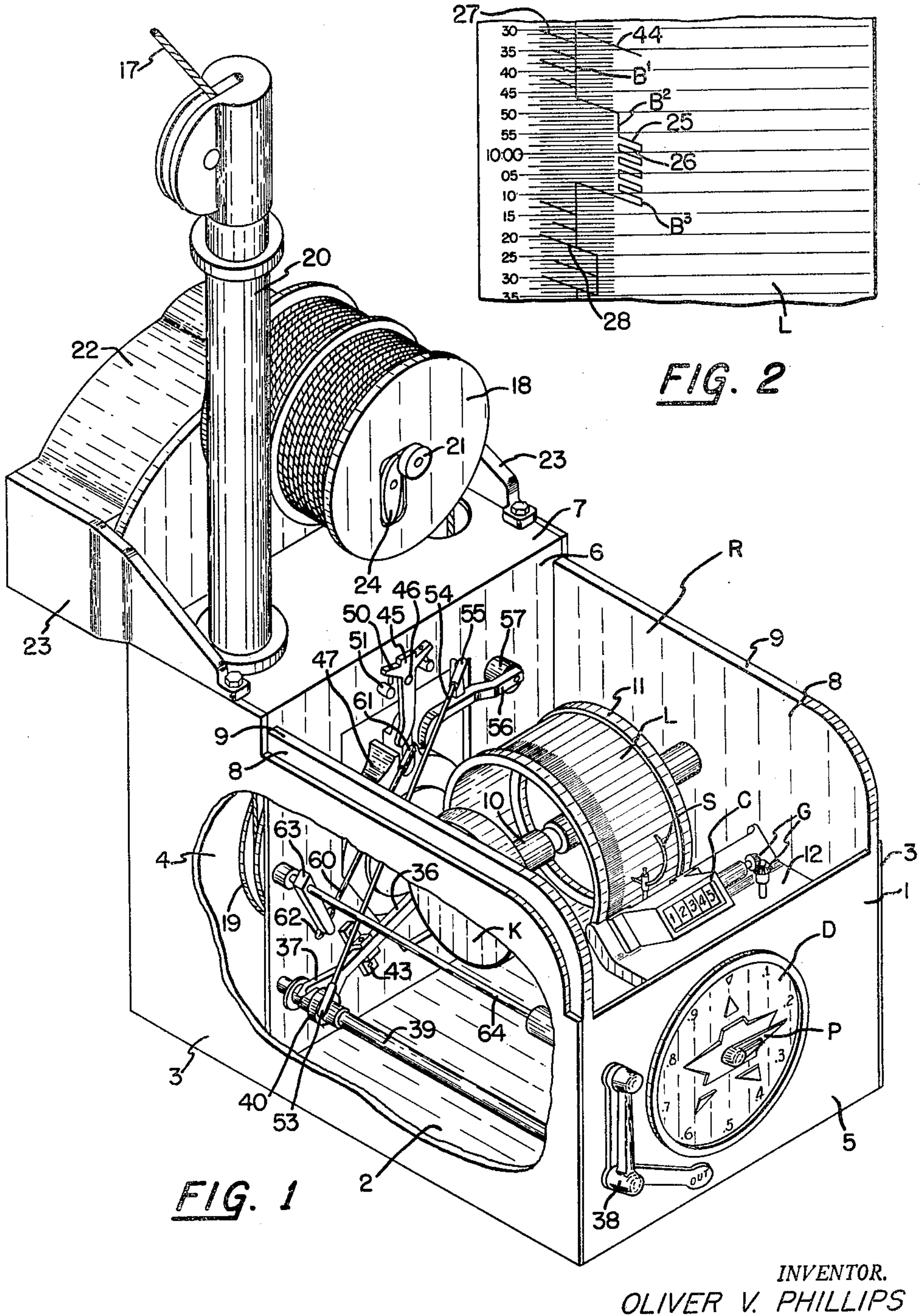
FIGURE 1 is an isometric view of the recording apparatus in its entirety.
FIGURE 2 is a view of a portion of a marked chart or log sheet employed with the apparatus.

Referring to the drawings in detail wherein like numerals represent similar parts throughout and wherein in FIGURE 1 there is shown for purposes of illustration and not limitation a preferred form of a recording apparatus in its entirety, a brief description of some of the major parts of such apparatus, generally represented by the letter R will now be given. It should probably be mentioned at the outset that many of these same parts are illustrated, perhaps more in detail, in my pending U.S. patent application Serial No. 462,833, filed October 18, 1954, now U.S. Patent Number 2,860,509 and entitled "Recording Apparatus for Earth Bore Drilling" and therefore, for a further explanation and showing of these parts, reference may be made to said application. The main essence of this invention and the principal difference in the recorder R and that illustrated in my pending application resides in the provision of a single stylus or pen together with associated structure for operating same whereby there is provided a novel means for recording by the single pen information relative to penetrations when drilling and other operations taking place in the bore when not drilling, all recordings being correlated with time.

In FIGURE 1, numeral 1 represents the recorder housing, preferably cast from suitable metal and having a base or bottom wall 2, side walls 3 (one of which is shown broken away), a rear wall 4, a front wall 5 and a partial partition 6 between the side walls 3. A permanent top 7 is provided between rear wall 4 and partition 6 and extending from front 5 along the side walls 3 are brackets 8 having rail surfaces 9 for supporting a cover, not shown, whereby when the cover is closed the housing 1 encompasses all of the parts within. To permit continual examination of log chart or sheet L and counter C, the cover is provided with a transparent opening throughout a substantial portion thereof.

Figure 3:
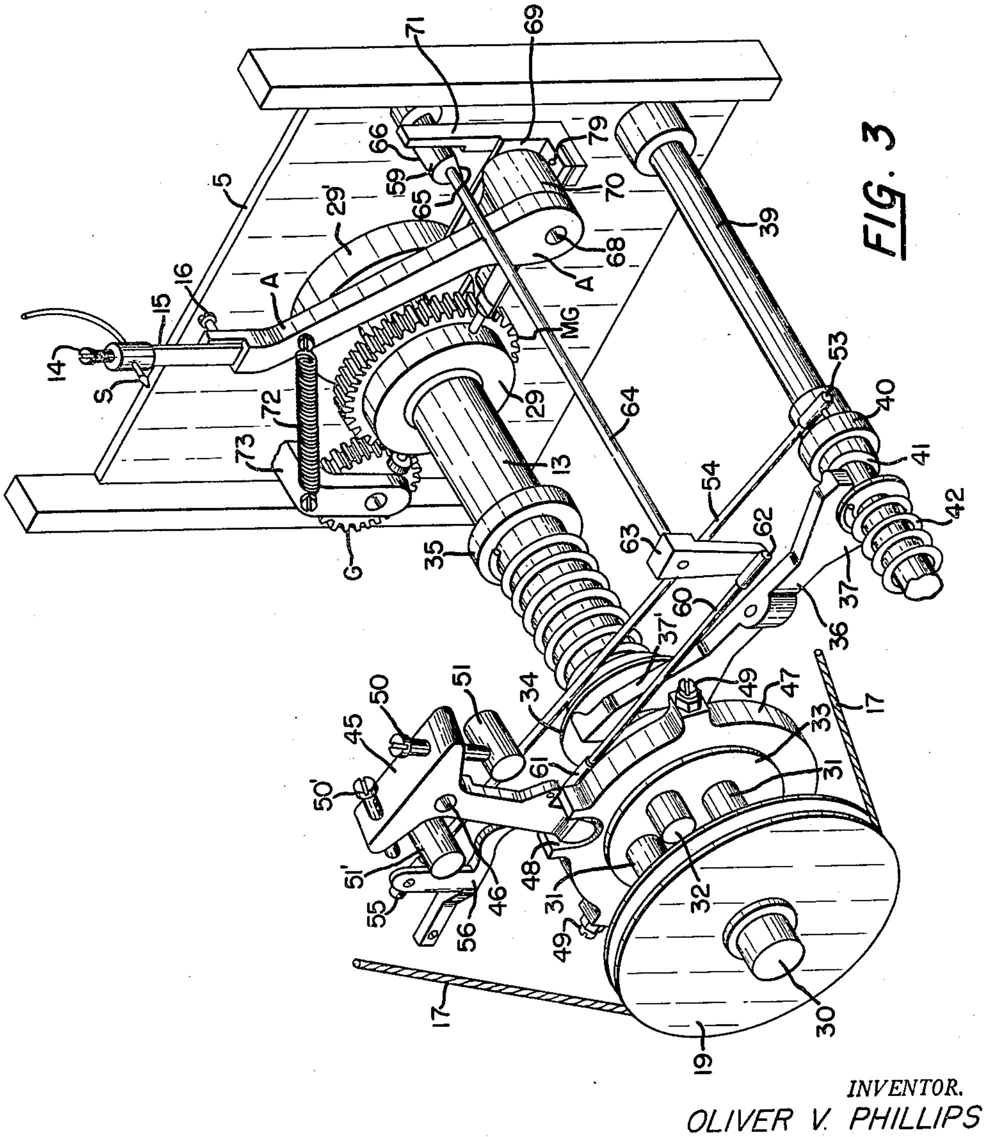
FIGURE 3 is an isometric view of certain parts of the apparatus with the stylus set for recording rate of drilling penetration.
Figure 5:
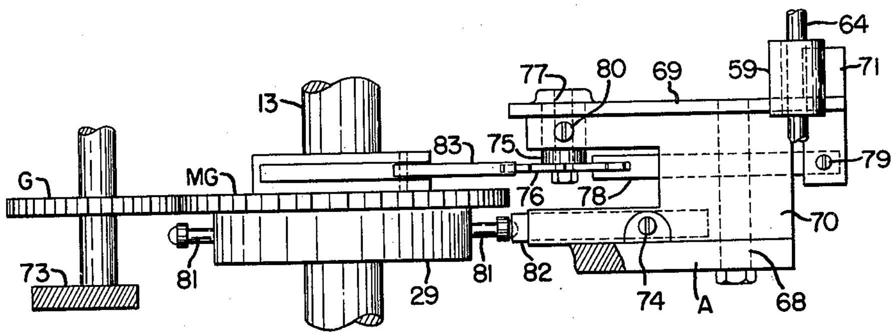
FIGURE 5 is a top view of the majority of the parts shown in FIGURE 4.
Figures 6, 7:
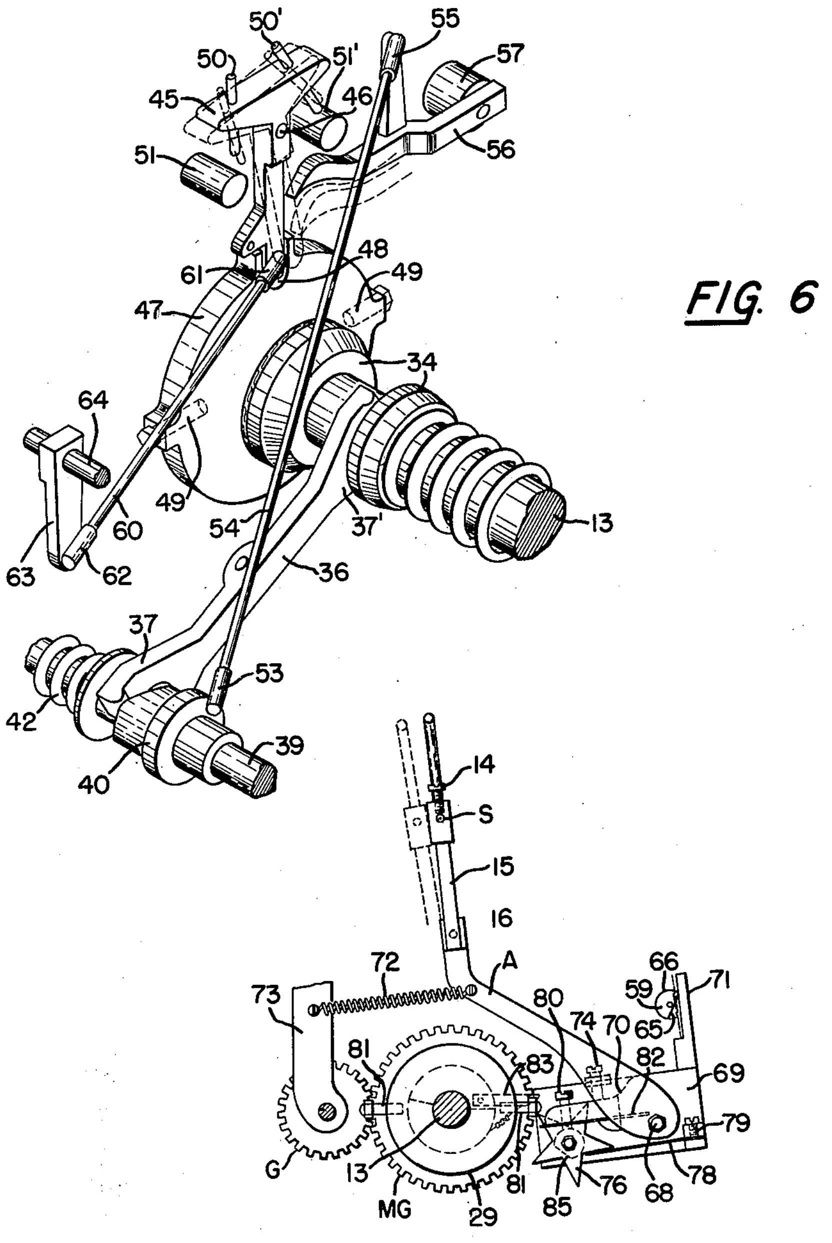
FIGURE 6 is an isometric view of another part of the recording apparatus when the latter has been set to record information relative to operations other than drilling.
FIGURE 7 is a view similar to FIGURE 4 but showing the parts as positioned when recording information relative to operations other than drilling.

K is a clock of the type commonly employed with well drilling equipment, preferably having a timing device that is timed for twelve hour rotation, and including a shaft 10 which rotates to drive chart drum 11 having detachably mounted thereon, by suitable spring biased hooks or the like, the log sheet L. The counter C, of standard construction and calibrated to indicate feet, is supported by bracket 12 which is integral with the rear of wall 5 and driven by a shaft 13 (shown in FIGURES 3 and 6) and a plurality of cooperating shafts and meshing gears G (some of which are shown in FIGURES 1, 3 and 7) including main gear MG. D represents a dial for visual footage indication and this dial is shown as calibrated in tenths of a foot, whereby one revolution is made per foot of hole drilled and the counter C registers the number of rotations of dial pointer P, the latter being connected for movement (through reduction gearing not shown) with shaft 13. The combined penetration and operations stylus or pen S is, as shown more clearly in FIGURE 3, mounted on and for movement with a stylus arm A to normally engage and mark chart L. This mounting may take several forms, but as illustrated includes the adjusting means 14 and spring bias means 15 that may be regulated by screw 16. Although not shown, the recorder also includes suitable releasing mechanism for disengaging stylus S with sheet L when it is desired to remove the latter from log chart L.

To record accurate information on chart L, the recorder R must be connected with the drilling equipment so that exact movements of the drilling string are reflected in the recorder R. This may be accomplished by training cable 17 from reel 18 over wheel or sheave 19 (shown more clearly in FIGURE 3 and constituting the main drive member of the recorder) and then connecting the cable through the guide tube 20 for movement with the drilling string in such a manner that the cable is continually maintained under tension. To maintain proper tension, reel 18 is keyed to shaft 21 which in turn is connected to a spring motor (the tension of which has been set) within enclosure 22 supported from the rear of main housing 1 by means including brackets 2. The reel 18, which is shown as divided into sections for receiving a spare cable, may be mounted for free wheeling on shaft 21 by pivoting spring biased dog 24 and this action is desirable when connecting the cable to the drilling stem and adjusting the tension of the spring motor. In any event, it is to be understood that the hookup results in cable 17 and in turn main drive member 19 which it drives being connected to the drilling string to accurately reflect in the recorder R all vertical movements of the drilling string.

A typical portion of a chart L having recordings thereon indicating rate of penetration and other operations with respect to time is shown in FIGURE 2 and it is to be noted that these recordings took place, roughly, between 9:30 and 10:30 a.m. As is apparent, the printings of time are for every 5 minutes and the closely spaced transverse lines represent minute periods. The chart sheet itself may be of any suitable material to receive the desired colored notations of the conventional stylus S or, if desired, sheet L may be made of some sort of pressure sensitized material in which event the stylus or marking pen S would require no ink. It is to be understood, and this is emphasized, that the markings indicated on chart L are all accomplished by the use of a single stylus S. $B^1$ represents a first base line position and marking made by the pen during drilling, $B^2$ represents a second base line position to which the pen is shifted when operations other than drilling are to take place in the well and $B^3$ is a limiting position to and from which the pen is moved during the recording of such other operations that require vertical movement of the drilling string. The intermediate lines between bases $B^2$ and $B^3$ represented by numeral 25 are caused by the drilling string being moved upwardly during other operations and the intermediate lines 26 are marked when the drilling string again moves downwardly during the recording of operations other than drilling. The stylus remains on position $B^2$ and forms the vertical lines shown when there is no vertical movement of the drill stem or when there are being conducted operations requiring downward movement of the string and such are correlated with time. The vertical lines of position $B^3$ indicate the time required for upward movement and the time elapsed before the string is again moved downwardly. When the stylus is in position $B^1$, the vertical lines in this position indicate the time required for drilling various formations, this record being complete when correlated with lines 27, which are marked to indicate each foot drilled and lines 28 which represent every ten feet of penetration.

Now considering FIGURES 1, 3 and 6, one complete revolution of gear MG which is mounted on hub 29 and keyed for rotation with shaft 13 (the latter being journaled for rotation at the front wall 5 by means including boss 29′) represents two feet of drilling and in this same connection the pointer P will be rotated (through reduction gearing) one revolution. The shaft 13 is rotated during drilling, but by suitable clutch means is disengaged from rotation when operations other than drilling are taking place in the well. Assuming that drilling is taking place, the driving connection for shaft 13 is as follows. Main drive member 19 is journaled for free wheeling on a shaft 30 which is rotatably supported by suitable means in rear wall 4 of housing 1 and connected integrally with shaft 13 and, as previously explained, cable 17 causes rotation of wheel 19. Extending from one face of sheave 19 are projections 31, these projections being arranged to engage one or more lugs 32 extending from the rear side of a clutch face plate or driven member 33, the latter also being journaled for free rotation about shaft 30. It can be appreciated that movement of wheel 19 causes corresponding movement of the plate 33, but it should be noted that due to the spacing of the projections and lugs 31 and 32 a limited amount of free play may take place to account for the usual jarring or jolting of the drill stem during actual drilling or the other operations taking place. A clutch body 34 is keyed for rotation with shaft 13, but the key arrangement (not shown) permits longitudinal movement of body 34 with respect to shaft 13. On the shaft 13 there is provided a permanent collar 35 and between this collar and the clutch body 34 there is provided a suitable spring which normally functions to urge the face of clutch body 34 into clutch engagement with plate 33 and preferably the face of the clutch member is made of cork or some other suitable gripping material. In FIGURES 1 and 3 it is to be assumed that the clutch face is in engagement with plate 33 and therefore when plate 33 is caused to rotate, corresponding rotation of shaft 13 and gear MG takes place.

When clutch throw-out fork 36, which is suitably pivotally mounted on a pillar block or the like 43 extending from partition 6 and which is provided with bifurcated or forked ends 37 and 37′, is positioned as shown in FIGURE 1, then a lever 38, known as an "In" and "Out" lever, is in its "In" position. Lever 38 is mounted on the outside of housing 1 so that it is readily available to the operator of the recording apparatus and it is journaled within partition 5 and connected to operate a shaft 39 also journaled for rotation between front wall 5 and partition 6 by any suitable means. A cam 40 is keyed to rotate with shaft 39 and is provided with a cam face 41 against which the forked ends 37 are continually urged by the biasing means 42, it being noted that the other ends 37′ are arranged to engage the clutch body. It should be apparent that when the lever 38 is thrown to the "Out" position, and this will be manually done by the operator when drilling ceases and other operations in the well are to be recorded, then shaft 39 and cam face 41 will correspondingly rotate and the face is of such configuration that the forked ends 37′ cause the clutch body 34 to be moved to the position shown in FIGURE 6, wherein the clutch face is disengaged from the plate 33 and thus there will be no rotation of shaft 13.

The limitations of transverse-like movement of the pen S are controlled by means including the T-shaped reversing lever 45 which is mounted for pivotal movement on a shaft 46 journaled in partition 6. Member 45 is caused to pivot by movement of a drag assembly ring 47, due to the fact that this ring is provided with a slot 48 for receiving the bottom of the T. Ring 47 is frictionally mounted on plate 33 by a plurality of drag buttons 49 and these buttons may be adjusted to vary the amount of friction between ring 47 and plate 33. The top of the T 45 is provided with depending lugs 50 and 50′ which are designed to engage and abut spaced projections 51 and 51′ extending from the front of partition 6 and the amount they depend may be readily adjusted to set the arc of travel of T 45, as will be apparent. When the plate 33 is rotated, the friction created by the drag buttons 49 is sufficient to cause corresponding movement of ring 47 until one or the other of lugs 50 and 50′ engages a projection 51 or 51′, whereupon the frictional force is overcome and further movement of ring 47 and T 45 by movement of plate 33 in the same direction is prevented.

To further control and limit the pivotal movement of T 45, there is provided the following structure, as is shown quite clearly in FIGURES 3 and 6. Connected for movement with cam 40 by suitable means 53 is a linkage 54 which has its other end connected by suitable means 55 to a reversing stop arm 56, the latter being mounted for pivotal movement between the solid and dotted line positions of FIGURE 6 by means 57 connected to partition 6. When the stop 56 is in the dotted line position of FIGURE 6 or the solid line position of FIGURE 3, the lever 38 is in the "In" position and the T 45 may be pivoted in an arc until one or the other of the lugs 50 or 50′ strike one of the projections 51 or 51′. However, when the stop 56 is in the solid line position of FIGURE 6, which in turn means that the lever 38 is in the "Out" position, then the pivotal movement of T 45 is limited to the arc defined by the solid and dotted line showings of the T in FIGURE 6, this arc actually being the distance of movement of T 45 from a position where lug 50′ engages projection 51′ to a position where the T is in about the middle of the projections 51 and 51′, such as the position shown in FIGURE 1.

Movement of the T 45 is imparted to a cam 59 (see FIGURE 3) through a linkage 60 connected with the T by suitable means 61 and also connected by means 62 to an arm 63 keyed with a shaft 64 which is journaled between partition 6 and front wall 5. The cam 59 is keyed for movement with shaft 64 and is of a shape similar to that of a D in cross section to provide the flat face 65 and the round circular surface 66. Extending rearwardly of the wall 1 there is provided suitable means including a shaft 68 about which are journaled for pivotal movement the stylus arm A and a bracket assembly 69 and a boss-like member 70. Bracket 69 has a normal tendency to pivot downwardly, as shown in FIGURE 7, but its position is controlled by the cam 59 against which the upstanding portion 71 of the bracket rides.

Figure 4:
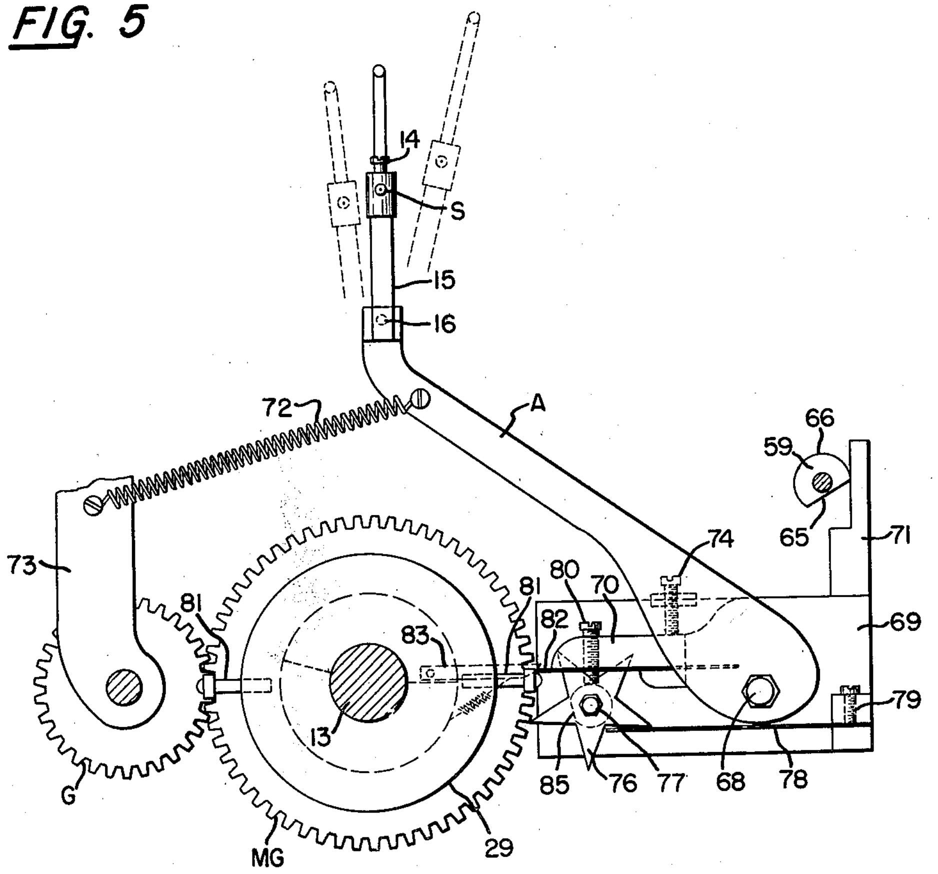
FIGURE 4 is a rear elevation view of the recording pen and some of its associated parts when the recorder is set for operation as in FIGURE 3.

For a description of the structure of elements 69, 70 and A and their associated parts, reference is made in particular to FIGURES 3, 4, 5 and 7. When drilling is taking place, and this will be further explained hereinafter, the pen S normally assumes the solid line position of FIGURE 4 due to the following arrangement. Arm A is biased by spring 72 connected at one end with arm A and at its other end with an integral bracket 73, but the action of the spring on arm A is limited by means to be described including the adjustable screw 74 (carried by arm A) engaging a surface of member 70, as shown in FIGURE 4. The member 70 also normally assumes the position of FIGURE 4 due to the action of spring 72 and its downward movement being limited by an adjustable screw 80 carried thereby and engageable with the round surface of a hub 75 of a five pronged star wheel 76. The wheel 76 and hub 75 are journaled for free rotation on a shaft 77 extending from bracket 69 (see FIGURE 5). Bracket 69 also carries a leaf spring 78 engageable at one end with wheel 76 to maintain the star wheel properly indexed and at its other end is connected with the bracket 69 by locking screw 79. Bracket 69 also is urged to pivot downwardly through means including spring 72 and screws 74 and 79, but such movement is limited by the upstanding portion thereof engaging round surface 66 of cam 59.

Still considering that the pen S is set for recording drilling penetration and referring particularly to FIGURES 2, 3, 4 and 5, the solid line position of the pen S in FIGURE 4 will result in marking on the chart L the vertical line of position $B^1$. Of course, it has to be assumed that the drilling string has moved downwardly enough to cause the T 45 to be positioned as in FIGURE 3 with lug 50 striking projection 51 and also cam 59 to be as in FIGURES 3 and 4. As mentioned, the T 45 is normally in the position shown when drilling, but if the string for some reason or other were moved upwardly and off bottom, say by mistake, the stylus S will shift to cause the marking 44 due to the cam being moved to have its flat face engage extension 71 as in the dotted line position of FIGURE 7. To provide on the chart an indication of every foot drilled, there is provided on the hub 29 at diametrically opposed points pawls 81 which are arranged to engage a leaf spring 82 carried by the boss member 70. It should be mentioned that every time the hub 29 makes one complete revolution there is one revolution of shaft 13 and thus there is the necessity for the use of two pawls 81 in order to obtain foot lines 27. It should be readily apparent that each time a pawl engages spring 82 it causes the boss member 70 to pivot upwardly and this same pivoting action is caused upon arm A due to screw means 74 and thus the pen S, each time a pawl hits spring 82, moves for the moment to the right as shown in FIGURE 4 to cause a marking 27. It is also desirable to have a representation on the chart of every ten feet of drilling and this is accomplished by means of a pawl 83, also keyed for rotation with shaft 13. This pawl during each of its revolutions engages the star wheel 76 and this action overcomes the indexing of leaf spring 78 and results in the wheel and hub 75 being rotated a notch. During the movement of the star wheel there will be a time when the screw 80 falls upon the flat portion 85 of the hub 75 and when this occurs the boss member 70 and in turn the arm A are pivoted to the left when viewed in FIGURE 4 to cause the pen S to move to the left and mark line 28 on the chart. Since a complete revolution of pawl 83 is equivalent to two feet of drilling and since there are five pawls on the star wheel, a line 28 will be drawn on the chart upon every ten feet being drilled and this marking will continue to say to the right of base line $B^1$ until the star is further rotated and the screw means 80 leaves the flattened portion, but nevertheless the footage lines 27 will be shown, as is apparent by reference to FIGURE 2.

Now considering only FIGURES 1, 2, 6 and 7 and assuming that lever 38 has been thrown to the "Out" position, such will result in the bracket 69, boss member 70 and arm A being normally pivoted to the solid line position of FIGURE 7, this being due to the extension 71 being engaged by the cam in the manner shown in solid lines. When the pen S is in this position it is in condition to mark the base line $B^2$ of FIGURE 2. Once the "Out" position is set and other operations in the drilling will take place, the pen S is permitted to move between base line $B^2$ and position $B^3$ or from the solid to the dotted line positions of FIGURE 7, thus causing the markings 25 and 26, depending upon whether the drill stem is moved upwardly or downwardly. When the lever 38 is shifted to the "Out" position, as explained, the clutch is disengaged, the stop 56 is moved to the position shown in the solid lines of FIGURE 6 and the cam 59 is moved to the solid line position of FIGURE 7, the extension 71 engaging the cam 59 intermediate its round and flat faces. At this time, the T as a general rule would assume the dotted line position of FIGURE 6 or the solid line position of FIGURE 1 where it is engaging the stop 56 and the vertical marking of position $B^2$ would be formed until there was upward movement of the drilling stem at which time the T would travel to the solid position of FIGURE 6. This latter action will cause cam 59 to move its flat face 65 into engagement with extension 71 and permit the stylus to mark an indication 25, as shown by the dotted lines of FIGURE 7.

*Brief Description of Overall Operation*

Assuming that the cable 17 is properly connected to accurately reflect movement of the drill stem and the lever 38 is in the "In" position, namely, as shown in FIGURE 1, then the apparatus is in condition for recording rate of drilling penetration. It should be noted that at this time the stop 56 is positioned as in FIGURE 3, whereby the T 45 may travel in an arc defined by the limits of lugs 50 and 50' striking projections 51 and 51'. After drilling has started and the lugs and projections 31 have been engaged, the ring 47 will carry the T 45 until lug 50 engages projection 51 and at this time the pen S will be in the solid line position of FIGURE 4 to provide a vertical mark on the base line position $B^1$. Also, the clutch will be engaged whereby the clutch body 34 is rotated by plate member 33 and the shaft 13 drives pointer P and through additional gearing and shafts, as explained, the counter C. Of course, the clock will also be in operation to cause continual rotation of chart sheet L. Every time there is one foot of drilling, one or the other of the pawls 81 will trip the leaf spring 82 to cause a line 27 and every time ten feet of drilling have resulted a line 28 will be formed by the action of pawl 83 on star wheel and hub 75 and 76. Thus, it should be apparent that there will be provided a continual record of drilling penetration with respect to time and, of course, the number of lines 27 could be varied by varying the number of pawls 81, as could the number of lines 28 by altering the number of pawls 83. During the movement of stylus S from the solid to the two dotted line positions of FIGURE 4, it will be noted that the arm A pivots independently of the bracket 69.

Now, when drilling is not taking place for some reason or other and some operations in the well such as those previously explained are to take place, if the operator shifts the lever 38 to the "Out" position which results in the parts assuming the positions of FIGURES 6 and 7, the clutch body 34 is disengaged to disconnect the counter and pointer P. However, the pen S records on the chart L these operations as by moving to the "Out" position the pen is shifted to base line position $B^2$ whereupon it may be shifted between $B^2$ and $B^3$ to cause the markings 25 and 26, depending upon whether the operations taking place in the well require upward or downward movement of the drill stem. Any vertical line on the base position $B^2$ can be marked by the pen of an operator to indicate what was going on at the time. It will be noted that when this recording is taking place, when stylus S is moved by arm A from the solid to the dotted line positions of FIGURE 7, arm A is pivoted with bracket 69 and boss member 70 as a unit or, in other words, the arm is driven by movements of T 45 and cam 59.

From the foregoing description it will be apparent that I have invented a recorder that achieves the objects enumerated. Although the recorder is shown as having a special use, its principles may be used in recorders for other purposes. Also, being aware of these possible modifications and uses, I desire it to be understood that the scope of the invention is not to be limited except in accordance with the terms of the appended claims and equivalents thereof. In the claims the term "stylus" where used is meant to be broad enough to cover a recording element generally.

What is claimed is:

1. In a recorder for earth bore drilling apparatus, control means adapted for controlling the movement of a stylus relative to a constantly movable chart sheet in response to the rate of penetration and direction of vertical movement of a drill stem, a drive member connectable with the drill stem to reflect vertical movements of the drill stem, said control means comprising: mounting means including a bracket pivotally mounting said stylus relative thereto and carrying a stop to control the extent of pivotal movement of the stylus in one direction, said bracket being pivotal to positions corresponding to a first and second base position for said stylus; first means normally connected for movement by said drive member to selectively pivot the stylus at predetermined intervals corresponding to the distance of penetration of the drill stem when the stylus is disposed for recording along said first base position on the chart; shifting means connected to said mounting means and being operative through adjustment of said bracket and stop to shift the stylus to said second base position on the chart for recording the direction of vertical movement of the drill stem during operations other than drilling while simultaneously shifting said first means out of connection to said drive member; and second means connected to said drive member for limited pivotal movement therewith including a cam member contacting said bracket to pivotally position it in said base positions, said second means being operative in response to actuation of said shifting means to move said cam member to position said bracket and stylus to the second base position and thereafter to translate the direction of movement of the drill stem through said cam member for pivotal movement of the stylus in a corresponding direction.

2. In a recorder according to claim 1 wherein means is provided for biasing the stylus against said stop in a direction opposite said one direction.

3. In a recorder according to claim 2 wherein said shifting means is operative to vary the disposition of said cam in relation to said bracket and stop means in order to vary the extent of movement of the stylus in the direction of bias.

4. In a recorder according to claim 1 wherein said second means is defined by a reversing lever disposed for limited pivotal movement, in response to corresponding pivotal movement of said drive member, together with means inter-connecting said reversing lever and said cam member to impart the pivotal movement of said reversing lever to said cam member.

5. In a recorder according to claim 4 wherein said second means is connected to said drive member so as to be responsive at all times to movement of the drill stem in an upward direction to cause pivotal movement of the stylus in both the first and second base positions.

6. In a recorder for earth bore drilling apparatus including a stylus and a constantly movable chart sheet, control means adapted for controlling the movement of said stylus relative to said constantly movable chart sheet and in response to the rate of penetration and direction of vertical movement of a drill stem, said control means comprising: a pivotal mounting assembly for pivotally mounting the stylus relative thereto including a shaft, a spring biasing the stylus in one direction of pivotal movement, and a limit stop; a cam member engaging said mounting assembly to control its position and thereby the extent of pivotal movement of the stylus in the direction of bias; a main drive member driven in response to vertical movement of the drill stem; a clutch including a rotatable shaft being connectable for rotation by said drive member, and with means on said shaft to selectively pivot the stylus at predetermined intervals corresponding to the distance of penetration of the drill stem when the stylus is disposed for recording along a first base position on the chart; shifting means interposed between said clutch and said cam member being operative to simultaneously disengage said clutch from said drive member and to vary the disposition of said mounting assembly and cam in relation to said stop so as to shift the stylus to a second base position on the chart for recording the direction of vertical movement of the drill stem during operations other than drilling; and second means connected to said drive member including a reversing lever mounted for limited pivotal movement in response to movement of the drive member and with means interconnecting said reversing lever and said cam member to impart the pivotal movement of said reversing lever to said cam member thereby to cause corresponding pivotal movement of the stylus.

7. Recording apparatus for recording the movement of a drill string with respect to drilling time comprising: a movable timed support means bearing a chart; a stylus movable relative to said support means and chart having a first and second base position; drive means responsive to movement of said drill string; a drive shaft; clutch means for clutching said drive means in and out of driving relationship with said shaft; first stylus actuating means on said shaft for actuating said stylus in said first base position; second stylus actuating means connected to said shaft for actuating said stylus in said second base position; pivotal mounting means constructed to pivot to positions corresponding to said first and second base positions pivotally mounting said stylus relative thereto and bearing a stop for said stylus to limit its movement in one direction; biasing means biasing said stylus in a direction opposite said one direction; a cam actuated by said second stylus actuating means operative to position said mounting means in positions corresponding to said first and second base positions and to normally contact said mounting means; and means for simultaneously unclutching said drive means from said shaft and actuating said cam to position said mounting means and stylus in said second base position in which said mounting means and stylus are actuated by said second stylus actuating means through said cam to reflect the movement of said drill string.

8. In a well boring recording device for providing a record of vertical movement of the drill string with respect to time comprising a chart supported on a timed movable support means, a recording means for making a record on said chart and operative to move relative to said chart means and to make a record in a first and a second base position; a first and a second actuating means for actuating said recording means in said first and second base positions, respectively, alternatively responsive to the vertical movement of said drill string; the improvement which comprises: a pivotal mounting means pivotally mounting said recording means carrying a stop for said recording means limiting its movement in one direction and movable to a first and second position corresponding, respectively, to said first and second base positions; cam means bearing against said mounting means and operatively connected to said second actuating means, said cam means being operative by movement to position said mounting means alternatively in said first and second positions; means for simultaneously rendering said first actuating means inoperative and actuating said cam means to move said mounting means to said second position, and biasing means biasing said recording means against movement in a direction opposite said one direction.

References Cited in the file of this patent

UNITED STATES PATENTS

| | | |
|---|---|---|
| 2,287,819 | Nichols | June 30, 1942 |
| 2,679,161 | Yancey | May 25, 1954 |
| 2,831,347 | Yancey | Apr. 22, 1958 |
| 2,883,256 | Nichols | Apr. 21, 1959 |